UNITED STATES PATENT OFFICE.

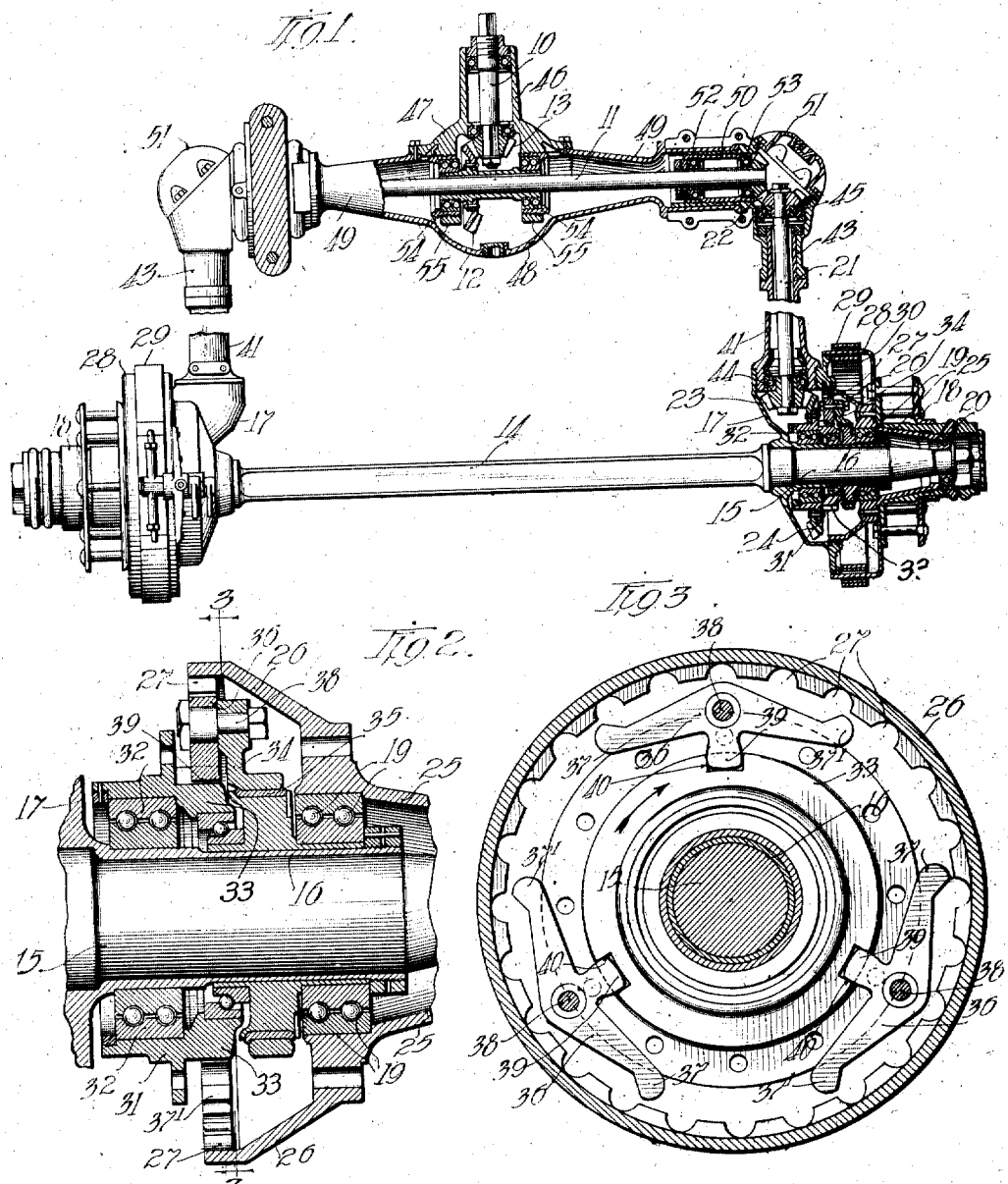

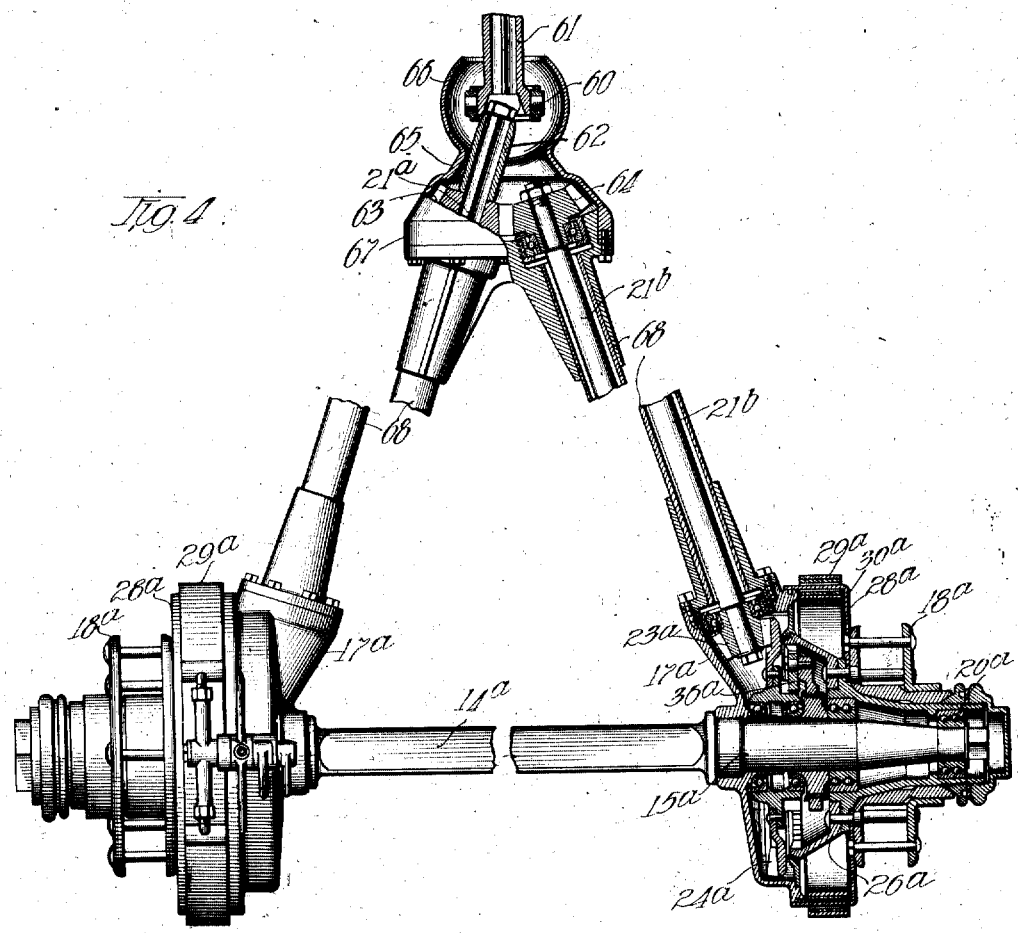
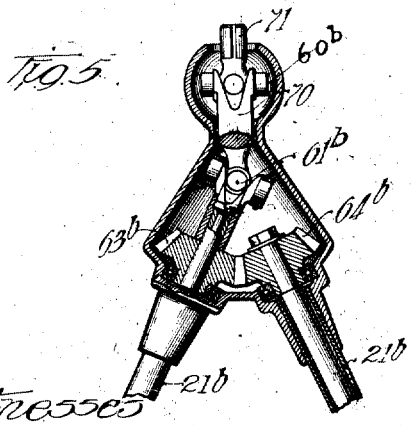
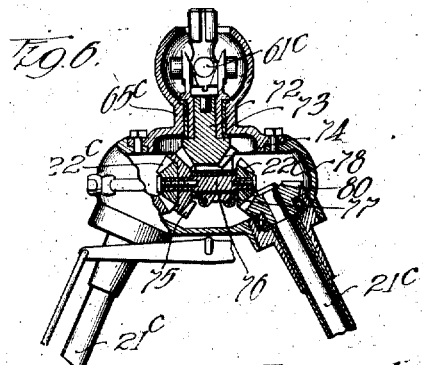

BROR A. ADLER, OF CHICAGO, ILLINOIS.

AUTOMOBILE DRIVING MECHANISM.

1,218,613.   Specification of Letters Patent.   Patented Mar. 6, 1917.

Application filed August 12, 1915. Serial No. 45,164.

*To all whom it may concern:*

Be it known that I, BROR A. ADLER, a subject of the King of Sweden, residing at Chicago, in the county of Cook and State of Illinois, have invented certain new and useful Improvements in Automobile Driving Mechanism, of which the following is a specification.

This invention relates to improvements in automobile driving mechanism and more particularly to combination of parts whereby the usual type of differential gearing becomes unnecessary.

One of the objects of my invention is to provide a driving mechanism in which a solid rear non-rotating axle supports the chassis and body, the wheels being independently driven through a pair of forwardly extending propeller shafts, in turn rotated by the transmission shaft.

A further object of my invention is the provision in combination with a solid rear axle construction of individual power transmitting devices capable of performing functions of the old form of differential gearing without the use of the usual trouble causing parts thereof.

Another particular object of my invention is to adapt such a drive mechanism for use with light cars, such as for example, the Ford, so as to adapt such cars for service as light delivery wagons and trucks by the addition thereto, of my improved drive mechanism, the usual form of beveled gear and differential transmission used in such car being too light and easily damaged by such service.

Other objects comprise the adoption of this invention to side drive trucks, wherein the propeller shafts are parallel, joining the rear wheels with the transverse shaft and doing away entirely with the troublesome chain drive, so commonly used in heavy vehicles.

Another object is the provision of the casing for the parallel drive outfit by means of which the parts may be readily separated and detached for repair or replacement without disassembling or knocking down the entire mechanism.

Other and further objects will become apparent to persons who are skilled in the art, from a consideration of the following description and drawings, wherein:—

Figure 1, is a plan view, parts being broken away and one side being shown in section, of my improved form of vehicle drive.

Fig. 2 is an enlarged fragmentary sectional view of the overrunning clutch device substituted for the usual form of differential gearing.

Fig. 3 is a vertical sectional view on the line 3—3 of Fig. 2.

Fig. 4 is a plan view, parts being broken away, and one side shown in section, of my improved vehicle drive as particularly adopted for use with relatively small cars.

Fig. 5, is a horizontal sectional view showing a modified form of connection between the transmission mechanism and propeller shafts, such as used in the installation shown in Fig. 4.

Fig. 6 is a horizontal fragmentary sectional view of still another modified form of gearing for transmitting power from the transmission mechanism to the propeller shaft such as shown in the installation illustrated in Fig. 4.

The type of shaft transmission illustrated in Fig. 1, of the drawings, is adapted more particularly for heavy vehicles, such as trucks upon which the double chain drive is now commonly used.

In this apparatus the power transmitted from the engine, after being carried through the sliding gear speed changing transmission mechanism is received at the short squared shaft 10, which in turn drives the transverse jack shaft 11 through the beveled gears 12 and 13.

The rear axle 14 is a solid fixed beam carrying the chassis and body. Each end of the solid axle 14 is reduced in tapered spindle form, as at 15, and carries a sleeve 16 forming a part of the gear-inclosing casing 17. The wheel-carrying hub 18 is rotatably mounted upon this spindle and supported on the annular bearings 19 and 20.

Power is communicated from the transverse jack shaft 11 to the rear wheel hubs 18 by means of the longitudinally disposed parallel propeller shafts 21, 21, one arranged at each side of the vehicle chassis and driven from the jack shaft 11 through the beveled gears 22. The rear ends of the propeller shaft 21—21 each carry beveled gears 23 meshing with beveled gears 24, associated with the hubs 18—18. The gears 24 are however not directly connected with the respective hubs but drive the same through an intermediate mechanism illustrated more in detail in Figs. 2 and 3, which permits overrunning of the outer drive wheel as in the usual type of differential apparatus, as when the vehicle is turning a corner and at the same time permits reversal of direction of rotation of the wheels and similar differential action when they are so reversed.

Each of the hubs proper, 18 is carried on a tapered sleeve 25 which extends inwardly beyond the hub and is enlarged into a cup-shaped casing 26, terminating at its inner end in an internal ratchet wheel 27. A brake drum 28, secured to the inner face of the hub 18, overlies the cup-shaped member 26, and through the usual type of brake actuating mechanism is clamped to the external band 29 or the internal band 30.

The beveled gear 24, previously referred to, is secured to a web 31, which rotates on the annular bearing 32 and carries a head 33 projecting inwardly toward the hub into the vertical plane of the ratchet wheel 27. Within the cup-shaped member 26 is mounted an intermediate disk 34, independently rotatable on the member 35 supported on the wheel spindle and carries three double-ended driving pawls indicated in general by the numeral 36 each having arms 37—37' extending in opposite direction and pivotally mounted at their centers upon pins 38 carried by the disk 34. An inwardly extending lug 39 is formed on each pawl and extends inwardly into engagement with a recess 40 formed in the member 33.

A jack shaft casing 41 makes screw threaded engagement with an opening in the casing 17 extending forwardly to a point adjacent the bevel gear wheels 22 at which place it is telescopically engaged by a second casing 43. An annular bearing 44 carried within the rear end of the casing 41 supports the rearwardly extending end of the propeller shafts 21—21, whereas an annular bearing 45 carried within the forward end of the casing 43 supports the other end of the propeller shaft.

A short tubular casing 46 incloses and provides support for the bearings of the stub-shaft 10, being enlarged at its rear into a bell shaped head 47, which engages around its periphery with gearing housing 48, of bulbous form, having the two laterally extending casing arms 49—49 inclosing the jack shaft 11.

A right angle tubular casing section 50 projects from the casing member 43 and telescopes within the outer end of the casing 49, thus completely housing the jack shaft and propeller shaft. The outer forward edge of the casing 43—50 is cut away for ready inspection of the gearing and the opening is covered by a detachable cap 51. The annular bearings 52—53, supporting the outer end of the jack shaft, are carried within the casing part 50 and the annular bearings 54—54 supporting the center of the jack shaft are carried in rings 55—55 preferably cast integral with the gearing housing 47.

From the above description it will be evident that when power is applied to the stub shaft 10 the wheel hubs 18—18 will be rotated through the medium of the jack shaft 11 and the propeller shafts 21—21. The rotation of member 33 in the direction indicated by the arrow in Fig. 3, causes the pawls 36 to swing upon their bearings 38 drawing the forward arms 37' into engagement with one of the teeth of the ratchet wheel 27 and transmitting power therethrough to the wheel carrying sleeve 25. Obviously, either of the vehicle wheels may rotate ahead of or at a rate of speed faster than the corresponding ratchet arm 37' thus permitting the usual form of differential action between the wheels as when the vehicle is traveling in any direction other than a straight line.

To reverse the direction of movement of the vehicle the action of the member 33 and the pawls 36 is reversed drawing the opposite pawl arms 37 into engagement with the ratchet teeth 27, thus driving the vehicle wheel in the reverse direction.

It will be noted that the mechanism is so arranged that when driving in either direction both wheels are positively driven thus eliminating the faults found with the usual differential gearing of driving only that wheel which has the least resistance.

In Figs. 4, 5, and 6 I have illustrated a modification of this form of drive particularly adapted for use with light cars, such as a Ford. Instead of using the transverse jack shaft 11 with the parallel propeller shafts 21—21, as in the type already described a pair of angled propeller shafts 21ª, 21ᵇ forming with the solid rear axle 14ª a triangle, the apex of which is positioned at the point usually occupied by the universal joint on the Ford car.

In Fig. 4 I have shown a universal joint 60 having its forwardly extending member 61 adapted to engage the stub shaft which extends rearwardly from the speed changing transmission of the Ford car and its rearwardly extending member 62 to engage the squared forward end of the left hand propeller shaft 21ª. On this shaft is carried a bevel gear pinion 63, in driving engagement with the bevel gear pinion 64 carried on the right hand propeller shaft 21ᵇ. A casing 65 is given a bulbous shape at its forward end 66 for engagement with the usual casing part of the Ford universal joint, its rear end being enlarged, as at 67, for inclusion of the bevel gears 63—64. Tubular casing members 68—68 extend rearwardly from the casing 67, and surround the respective propeller shafts and make engagement at their rear ends with the drive mechanism housing casing 17ᵃ. The tubular shaft-inclosing casing 68—68 thus serve as reach or torque rods taking up the driving torque and eliminating the special torque rods usually found on such cars.

I have in Fig. 4, indicated the corresponding parts of the drive mechanism by the same numerals as shown in Fig. 1, adding thereto distinguishing letter exponents.

In Figs. 5 and 6 I have indicated two modifications of the forward end connection for the propeller shafts indicating the propeller shaft in Fig. 5, by the numeral 21ᵇ—21ᵇ, and in Fig. 6 by means of the numeral 21ᶜ—21ᶜ. In Fig. 5 an intermediate connection 70 is provided between the forward end 71 which makes connection with the drive shaft of such a car and the universal joint 60ᵇ. From the universal joint 61ᵇ the drive is similar to that illustrated in Fig. 4, a beveled gear 63ᵇ being carried on the left hand propeller shaft and meshing with the beveled gear 64ᵇ, carried by the other propeller shaft.

In Fig. 6 a somewhat more substantial form of drive is provided with the elimination of the universal joint 61ᵇ having to work under disadvantageous circumstances as in the prior instances. In Fig. 6, the universal 61ᶜ, is substantially straight and does not work through a large angle, as in the other instances, its rear end being connected with a short stub shaft 72, supported in a bearing 73, in the casing 65ᶜ. The rear end of this stub shaft 72 carries a bevel gear pinion 74 which meshes with a corresponding bevel gear pinion 75 carried on the short transverse jack shaft 76 supported in a bearing 77.

This bearing in turn is carried in a member 77 preferably formed integral with the rear section 78 of the casing 65ᶜ. Secured to the opposite ends of the short jack shaft 76 are beveled gear pinions 22ᶜ—22ᶜ meshing with the beveled gear pinions 80 secured on the forward ends of the propeller shafts 21ᶜ—21ᶜ.

It will be obvious from the detailed drawings in Figs. 2 and 3, that with such a construction we have at all times a positive drive from the engine through to each rear vehicle wheel, there being no favoring of one wheel or the other as in the usual type of differential gearing. At the same time either wheel is free to rotate at a rate of speed faster than that of the other for going around corners and the like but should one wheel drop into a mud hole, or similar unfavorable road condition, both wheels will rotate giving positive tractive effort to one wheel or the other. In the usual type of differential, as is well known, the wheel in the mud hole is free to rotate and spin and no power whatever is transmitted to the other wheel.

Whereas I have illustrated and described a preferred embodiment of my invention, it is obvious that various changes may be made therein, without departing from the spirit and scope of my invention.

What I claim is:

1. In combination with a relatively stationary axle, of a wheel hub structure containing a bearing to receive the axle and a differential gearing immediately surrounding said bearing, comprising a hub casing upon which to mount the wheel to be driven; a driving member, independent of said axle; an intermediate member rotatable independently of said members and axle; a ratchet annulus carried by said hub casing; a double ended pawl carried by said intermediate member and means carried by the driving member to cause driving engagement of the driving member with the hub casing by movement of either end of said pawl into driving relation with said ratchet annulus according to direction of rotation of said driving member.

2. In combination with a relatively stationary wheel supporting member, of a wheel hub structure containing a bearing to receive the supporting member, and a differential gearing comprising a driving member independent of said supporting member, an intermediate member rotatable independently of the other members, a ratchet annulus connected with said wheel hub, a double ended pawl carried by the intermediate member and means carried by the driving member to cause driving engagement of the driving member with the wheel hub by movement of either end of said pawl into driving relation with said ratchet annulus according to direction of rotation of said driving member.

3. In combination with a relatively stationary axle, of a wheel hub structure containing a bearing to receive the axle and a differential gearing immediately surrounding said bearing, comprising a hub casing upon which to mount the wheel to be driven; a driving member independent of said axle and having notches formed in the periphery thereof, an intermediate member rotatable independently of said members and axle, a ratchet annulus carried by said hub casing, a plurality of double ended pawls having radially inwardly extending lugs formed thereon for engagement with the notches in the driving member, said double ended pawls being carried by the intermediate member, whereby either one or the other of the ends of said pawls are moved into driving relation with the said ratchet annulus according to the direction of rotation of said driving member.

In testimony whereof I hereunto set my hand in the presence of two subscribing witnesses.

BROR A. ADLER.

In the presence of—
MARY F. ALLEN,
FONÉE BAIN.